United States Patent [19]

Funk

[11] Patent Number: 4,676,068

[45] Date of Patent: Jun. 30, 1987

[54] SYSTEM FOR SOLAR ENERGY COLLECTION AND RECOVERY

[76] Inventor: Harald F. Funk, 68 Elm St., Murray Hill, N.J. 07974

[21] Appl. No.: 812,989

[22] Filed: Dec. 24, 1985

Related U.S. Application Data

[63] Continuation-in-part of Ser. No. 574,628, Jan. 27, 1984, abandoned, which is a continuation-in-part of Ser. No. 530,650, Sep. 9, 1983, Pat. No. 4,513,573, which is a continuation of Ser. No. 205,348, Nov. 10, 1980, Pat. No. 4,411,346, which is a continuation-in-part of Ser. No. 962,103, Nov. 17, 1978, Pat. No. 4,265,088, which is a continuation-in-part of Ser. No. 674,219, Apr. 6, 1976, Pat. No. 4,126,000, which is a continuation-in-part of Ser. No. 565,045, Apr. 4, 1975, Pat. No. 3,970,524, which is a continuation-in-part of Ser. No. 486,562, Jul. 8, 1974, abandoned, which is a continuation-in-part of Ser. No. 252,610, May 12, 1972, abandoned.

[51] Int. Cl.$^4$ .............................. F03G 7/02; F24J 3/02
[52] U.S. Cl. ........................... 60/641.14; 60/641.15; 126/430; 126/438; 126/451
[58] Field of Search .............. 126/430, 438, 451; 60/650, 682, 641.14, 641.15

[56] References Cited

U.S. PATENT DOCUMENTS

| | | | |
|---|---|---|---|
| 4,262,484 | 4/1981 | Jubb et al. ..................... | 126/438 X |
| 4,280,327 | 7/1981 | Mackay .......................... | 126/451 X |
| 4,280,482 | 7/1981 | Nilsson, Sr. ..................... | 126/430 |
| 4,304,219 | 12/1981 | Currie ........................... | 126/430 X |
| 4,318,393 | 3/1982 | Goldstein ....................... | 126/451 X |

Primary Examiner—Allen M. Ostrager
Attorney, Agent, or Firm—Sixbey, Friedman & Leedom

[57] ABSTRACT

A system for the collection of solar radiation and the recovery of thermal energy therefrom includes solar radiation receiver means at or near the focus of a solar radiation concentrating means for absorbing the solar radiation, converting it to thermal energy and transferring the thermal energy to ambient air drawn over the receiver means and, thereafter, directed to an energy reclamation unit. In the energy reclamation unit the heated ambient air deposits a portion of its thermal energy in regenerators, from which it is recovered by a compressed air stream, and transfers a portion of its thermal energy to a power fluid. The thermal energy of the ambient air is reclaimed from the compressed air stream and the power fluid as shaft work in expansion turbines. In a preferred embodiment, the solar radiation receiver means comprises a high temperature resistant, porous, convex enclosure having inner and outer porous, convex surfaces arranged in spaced apart nested relationship for defining therebetween an annular space which is randomly filled with a plurality of close to ideal black body solar radiation absorbing elements.

21 Claims, 5 Drawing Figures

SYSTEM FOR SOLAR ENERGY COLLECTION AND RECOVERY

CROSS REFERENCE TO RELATED APPLICATIONS

The present application is a continuation-in-part of application Ser. No. 574,628, filed Jan. 27, 1984, now abandoned, which application was a continuation-in-part of application Ser. No. 530,650, filed Sept. 9, 1983 (now U.S. Pat. No. 4,513,573), which application was a continuation of application Ser. No. 205,348, filed Nov. 10, 1980 (now U.S. Pat. No. 4,411,346), which application was a continuation-in-part of application Ser. No. 962,103, filed Nov. 17, 1978 (now U.S. Pat. No. 4,265,088), which application was a continuation-in-part of application Ser. No. 674,219, filed Apr. 6, 1976 (now U.S. Pat. No. 4,126,000), which application was a continuation-in-part of application Ser. No. 565,045, filed Apr. 4, 1975 (now U.S. Pat. No. 3,970,524), which application was a continuation-in-part of application Ser. No. 486,562, filed July 8, 1974 (now abandoned), which application, in turn, was a continuation-in-part of application Ser. No. 252,610, filed May 12, 1972 (now abandoned), the disclosures of which are incorporated herein by reference.

DESCRIPTION

1. Technical Field

The present invention relates generally to a system for the efficient utilization of solar energy and, more particularly, to methods and apparatus for the collection of solar radiation and the recovery of thermal and conversion to mechanical energy therefrom.

2. Background Art

Many systems of various types have been devised for the collection and recovery of thermal and conversion to mechanical energy from solar radiation. In some systems, simple unfocused solar collectors are used to collect solar radiation and convert it to mechanical energy. These systems typically operate in a relatively low temperature range, for example from 80°–125° F. Other systems operate at much higher temperatures, up to several thousand degrees, and utilize concentrating means to focus the solar radiation in an effort to more efficiently collect and recover the energy thereof.

The higher temperature systems frequently employ parabolic mirrors, reflectors or other solar radiation focusing devices, to concentrate the radiation in a small area, typically referred to as the focus of the mirror or device. At the focus, where temperatures of 1000°–1200° C. are not uncommon, the solar radiation impinges on and transfers its thermal energy via a heat exchanger to a heat exchanger fluid from which the thermal energy is reclaimed in any number of well known ways. The heat exchanger generally comprises an array of tubes or pipes carrying a heat transfer fluid, such as a power fluid, air or steam. Thermal energy reaches the fluid via indirect heat transfer, the thermal energy of the solar radiation impinging on the tube or pipes and the surrounding air to transfer heat to the tubes and pipes by radiation and convection and then through the walls of the tubes or pipes to the heat transfer fluid by conduction and convection.

Illustrative of the patent art relating to focused solar radiation systems for the collection, recovery and reclamation of solar energy, which systems utilize conduction through metallic members to transfer thermal energy to a heat transfer fluid, is U.S. Pat. No. 4,081,966—deGeus which discloses a solar operated power generator wherein concentrated solar energy is focused onto copper tubes having a low boiling fluid therein for vaporizing and superheating the fluid and then expanding the fluid in turbine means. U.S. Pat. No. 4,235,225—Doebel discloses a device for improving solar energy collection efficiency wherein the sun's solar energy rays are concentrated onto a plurality of metal, e.g., copper, brass, aluminum, steel, cores through which a heat transfer medium is circulated. Likewise, U.S. Pat. No. 4,153,039—Carroll shows the use of parabolic mirrors for focusing sunlight onto a metallic pipe designed for carrying a heat transfer fluid therein. U.S. Pat. No. 4,068,474—Dimitroff discloses that steam to be supplied to a turbine may be generated by concentrating solar energy onto a conductor element having portions extending into a water reservoir for transferring the solar energy via conduction through the conductor element to the water for producing steam.

The use of indirect heat transfer, such as is disclosed in the aforedescribed solar collection systems is inefficient and results in a substantial loss of thermal energy. In addition, the very high temperatures at the focus are sufficient to melt highly conductive, high heat transfer coefficient metals, such as copper or aluminum, and therefore these metals cannot be used. As a result, high temperature solar collectors utilize low heat transfer coefficient metals such as stainless steel for the tubes or pipes. Such metals can withstand the high temperatures at the focus but their relatively poor heat transfer characteristics, both in absorbing the sun's rays and in conducting the thermal energy to the heat transfer fluid, introduce significant additional thermal inefficiencies to the heat transfer process. An additional problem with conventional solar collection systems is that the metal tubes and pipes are continually subjected to thermal stresses which weaken the metals. These thermal stresses are created by the uneven heating resulting from the parabolic mirror sides of the tubes and pipes being very hot compared to the sun facing sides and by the constant thermal cycling due to daytime heating and nighttime cooling of the tubes and pipes.

As a result of the foregoing problems the use of metal heat exchange tubes and pipes in focused solar radiation collectors is clearly not desirable. Nevertheless, metal tubes and pipes appear to be better than non-metal alternatives available to date. For example, the non-metal heat exchange elements for solar heating disclosed in U.S. Pat. Nos. 4,257,481—Dobson and 4,222,373—Davis include a dark colored upper layer onto which the solar radiation impinges and internal ducting, provided by embedded pipes or formed in the non-metal element, in which a fluid transfer medium, such as water, circulates. Presumably, the exposed, dark upper layer surfaces absorbs the sun's rays and transfers the thermal energy through the body of the non-metal element to the fluid circulating in the ducting. However, such an element is thermally inefficient in its ability to transfer heat because the fluid is in closed conduits not exposed to the solar radiation and heat transfer thereto relies primarily upon conduction through the non-metal element, an element formed of concrete, cement or ceramic materials which are even poorer thermal conductors than metal such as stainless steel. The same is true in U.S. Pat. No. 2,760,920 wherein a parabolic reflector focuses the sun's rays onto the parabolic, substantially black body heat absorbing surface of a steam generating furnace. Water from any suitable source is fed through the furnace and is heated to produce steam by thermal energy conducted through the black body.

There have been some efforts at solving these heat transfer problems by employng ambient air drawn, via a fan or like compressor means, through a solar energy receiver and over solar energy collection elements which have been heated, at least to a substantial extent, by radiation. For example, U.S. Pat. No. 4,394,859—Drost teaches a tower-mounted solar energy receiver for heating air adjacent the receiver and drawn, via a fan, through air passages defined by a vertically oriented elongated slat array, over fin-shaped individual slats, and into a centrally disposed collector tube comprising a vertical pipe having apertures for receiving the heated air. The fin-shaped slats have a large surface area relative to the area exposed to solar radiation and therefore depend on conduction to heat the unexposed areas of the slats. This unfortunate dependence on the dual mechanisms of radiation and conduction requires selection of a slat material which is useful for both mechanisms. The result is the selection of an intermediate material, such as ceramic or steel, which are poor to mediocre conductors and radiators. Solar energy is reflected from a heliostat field to the receiver which absorbs a portion of it via radiation, distributes the heat energy along its length via conduction, and then transfers the resultant heat energy to the air passing thereover.

In U.S. Pat. No. 4,318,393—Goldstein, solar radiation is reflected by a plurality of heliostats and absorbed on the outer surface wall of a tower mounted solar receiver, the receiver comprising a metallic or refractory wall having holes serving as pores. The wall may be formed from solid sheet material in which cylindrical holes are formed by drilling or the holes may be in the nature of natural openings resulting from the sintering of refractory particles to form the sheet. Heat is conducted from the solar heated outer wall through the wall and is transferred to atmospheric air drawn through the pores by the contact surface within the pores and on the inner and outer wall surfaces.

None of the solar energy receivers disclosed to date are sufficiently efficient from a thermal energy transfer standpoint while at the same time sufficiently simple, rugged, small, compact and lightweight to be air transportable and susceptible of on-site assembly. Therefore, none can serve as portable power units capable of being skid-mounted or otherwise packaged and being flown or air dropped into remote areas to provide small, relatively high power-density units for pumping water, for example, for irrigation and/or drinking, generating electricity, or performing other energy requiring tasks. Such a unit would be particularly suitable for geographical areas normally receiving considerable sunshine, such as desert areas of the Middle East, or third world countries in Africa.

It is therefore the purpose of the present invention to overcome previously encountered difficulties and to provide a thermally efficient and simple method and a lightweight, rugged, air transportable and easy to assemble apparatus for the collection of solar radiation and the recovery of thermal energy therefrom.

3. Disclosure of the Invention

In one aspect of the present invention this is accomplished by providing a system for the collection of solar radiation and the recovery of thermal energy therefrom which includes solar radiation receiver means at or near the focus of a solar radiation concentrating means for directly transferring the solar energy to the receiver means and from the receiver means to the ambient air, the receiver means having a configuration and being formed of materials which maximize absorption of solar radiation and thermal transfer to the ambient air.

In another aspect of the present invention the ambient air which is heated by thermal energy transfer from the receiver means is drawn into an energy reclamation unit wherein the heated ambient air is cooled in regenerators in heat-exchange relationship with solid materials having relatively large surface area to volume ratios to produce a warm air stream from which the residual thermal values may be recovered.

In still another aspect of the present invention the thermal energy of the heated ambient air deposited in the regenerators may be withdrawn and recovered by passing compressed air through the heated regenerators to produce a hot compressed air stream from which the thermal values may be recovered.

In a preferred aspect of the present invention the thermal values of the hot compressed air stream as well as the thermal values remaining in the warm compressed air stream are converted to mechanical energy and reclaimed as shaft work in expansion turbines.

In yet another aspect of the present invention the solar radiation receiver means comprises a solar collector having an annular solar energy absorbing bed comprising a plurality of relatively small solar radiation absorbing, close-to-ideal black body elements supported by at least one high temperature resistant porous surface, the bed having a substantially uniform cross-sectional thickness such that solar radiation impinging on the receiver means is absorbed and transfers thermal energy to the black body elements by radiation, thus heating the elements to a high temperature. Ambient air drawn through the solar radiation heated bed follows a tortuous path around the bed elements to increase the bed surface contact area and thereby enhance heat transfer via radiation and convection from the bed to the air.

In another aspect of the invention the components comprising the present system for the collection of solar radiation and the recovery of thermal energy are rugged, compact, relatively lightweight, air transportable and easy to assemble on-site to permit transport of the system to and assembly of the system on-site at remote locations where more conventional power sources are not readily available.

BRIEF DESCRIPTION OF THE DRAWINGS

The invention will be better understood by reference to the following description taken in conjunction with the accompanying drawings, in which.

BEST MODE FOR CARRYING OUT THE INVENTION

Figure 1:
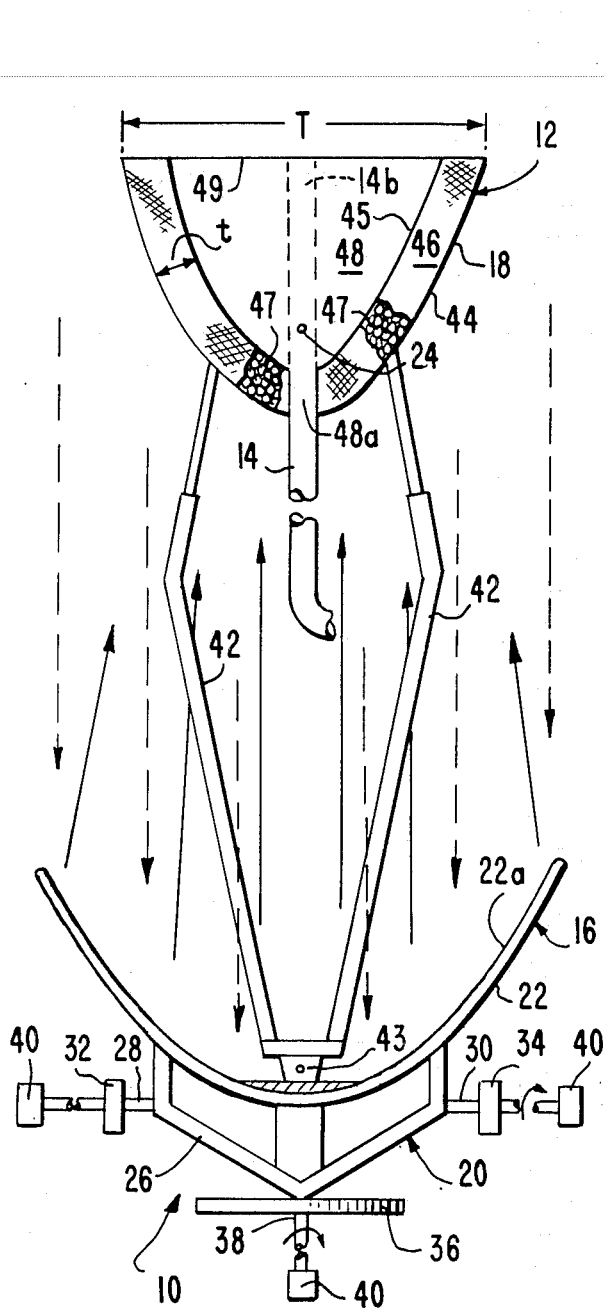
FIG. 1 is a front elevation, with portions broken away, of a system for collecting solar radiation in accordance with the present invention.
Figure 4:
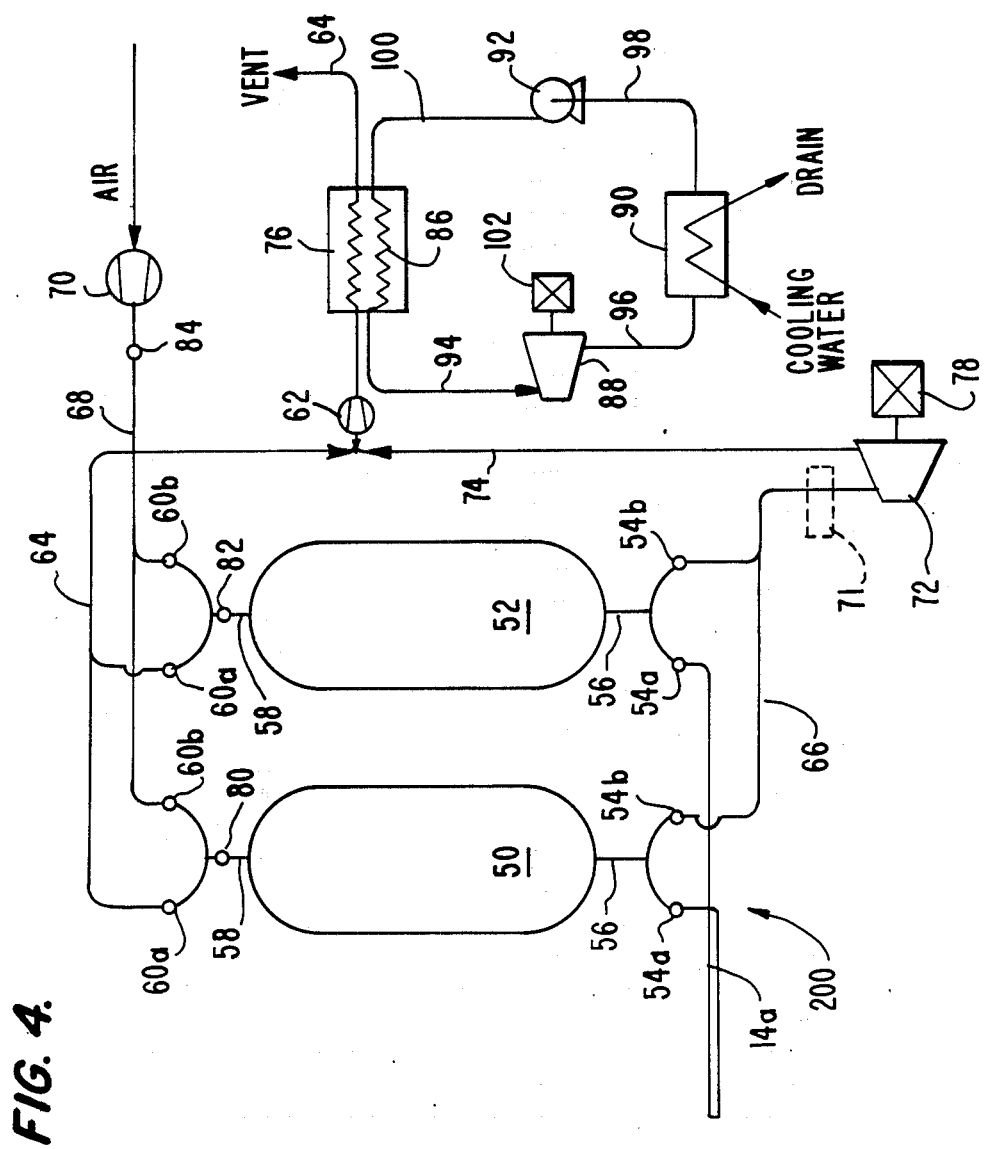
FIG. 4 is a schematic flow diagram of a system for recovering the thermal energy values from air heated to solar radiation in accordance with the present invention.

Refering to FIG. 1, a solar radiation collection system is indicated generally by the numeral 10. The system 10 includes solar radiation collector unit 12 for absorbing solar energy and heating ambient air and ambient air conduit means 14 for directing the heated ambient air from collector unit 12 to an energy reclamation unit (shown as 200 in FIG. 4) for recovering thermal energy values and reclaiming mechanical energy values from the heated and compressed ambient air.

Solar radiation collector unit 12 includes a solar radiation concentrating means 16, such as a parabolic reflector, supporting a solar radiation receiver means 18, both of which receiver and concentrating means are mounted on sun tracking and mounting means 20 and move as a unit so that they are always directly pointed toward the sun. The solar radiation concentrating means 16 consists of a parabolic reflector or mirror bowl 22, which is desirably formed in readily assembled sections for ease of transportation, by which incident solar radiation, indicated by dashed lines with arrow heads, is reflected from its inner surface 22a to a point at its parabolic focus 24. The reflector or bowl 22 is mounted on a suitable mounting and sun tracking means 20 which can be rotated and tilted to vary the angle of the reflector so that it directly faces the sun during the entire daylight hours. One suitable sun tracking means comprises a framework 26 for mounting reflector or bowl 22 having a pair of diametrically extending axles 28, 30 mounted in bearing standards 32, 34. A rotary table 36 supports framework 26 from its underside and includes a depending drive axle 38. Driving devices, such as motors 40, are drivingly connected to axles 28, 30 and 38 so that reflector 22 may be tilted about axles 28, 30 and rotated with table 36.

A solar radiation receiver means 18 is movably positioned at the parabolic focus 24 in any conventional manner, such as on individually adjustable telescoping mounting braces 42 which are connected between receiver 18 and inner surface 22a of reflector 22. Focusing the incident solar radiation onto focus 24 concentrates the solar energy at this point creating a heat sink region in which the solar radiation receiver means 18 is positioned to absorb the incident solar radiation. Solar radiation comprises electromagnetic waves beamed from the sun and projected in a straight line to be converted to heat when impinging upon the solar radiation receiver means 18. Temperatures at focus 24 are typically very high, often in the range 1000° to 1200° C. or above, requiring a receiver means 18 which can withstand such high temperatures while, at the same time, efficiently function as a thermal collector and transferor of heat. Inasmuch as temperatures are highest at focus 24 it may at times be desirable to move receiver means 18 away from the focus to decrease the temperature thereof. For this purpose mounting braces 42 are telescopingly adjustable for moving receiver means 18 toward and away from focus 24, for example toward or away from parabolic bowl 22 and/or in any radial direction about pivot axis 43.

The incident solar radiation reflected by concentrating means 16 impinges on and is absorbed by receiver means 18 to convert the radiation to thermal energy, heating the receiver means to the very high focus temperatures, e.g., 1000°-1200° C. The thermal conversion is direct and achieved principally by the mechanism of radiation, which is essentially a surface phenomena. To achieve this in an efficient manner receiver means 18 comprises a solar collector having a large surface area and formed of or coated with a close to ideal black body material. Exemplary of such materials are certain ceramics, carbon such as graphite and lampblack, various type paints, asbestos, brick, burnt clay, and the like. Desirable materials from the standpoint of emissivity are materials having a total emissivity of 0.80 or better, preferably 0.90 or better, at the focus temperatures. For example, extremely desirable materials include lampblack having a total emissivity of about 0.945 and red brick having a total emissivity of about 0.93. The thermal energy of the high temperature receiving means is transferred directly to the ambient air adjacent the receiving means 18 to heat the air, desirably via the heat transfer mechanisms of radiation and convection. Heating of the ambient air is also primarily a surface phenomena and, to be efficient, the receiving means must have a configuration which maximizes the surface area in contact with the air in order to maximize heat transfer to the air.

This is best accomplished, in accordance with the present invention, by providing a receiver means comprising a porous convex surface solar collector in which the convex surface curves outwardly toward parabolic reflector 22. The porous surface may be a sheet having perforated openings therein but, more desirably, is a mesh or screen comprising a plurality of entwined threads defining a plurality of open spaces between adjacent threads. The collector comprises an outer porous convex surface 44 and an inner porous convex surface 45 defining therebetween an annular space 46, most desirably of uniform cross-sectional configuration and dimensions. Filling the annular space 46 between inner and outer surface 44, 45 are a plurality of randomly arranged close-to-ideal black body elements 47 serving as the solar radiation absorbing surfaces of the collector. The elements may be spherical, cylindrical, disc or saddle shaped (hollow or solid), pebbles, or any other high surface area configuration, regular or irregular, suitable for filling annular space 46. In a preferred form, the outer surfaces of the elements are roughened or porous to maximize the surface area available for radiation absorption and subsequent heat transfer. Desirably, the mininum element dimension is at least ¼ inch. Inasmuch as the space "t" between the inner and outer surfaces 44, 45 is desirably at least 2 inches, the elements 47 desirably have no dimension exceeding ¾ inch. It will, of course, be appreciated that in larger collectors where the space "t" between the inner and outer surfaces is larger, the dimensions of the radiation absorbing elements may also be larger.

The mesh forming the inner and outer collector surfaces 44, 45 serves only to retain and contain the radiation absorbing elements 47 within the annular space 46. Therefore, the mesh spacing between adjacent mesh threads need be not much closer than the minimum element dimension. Indeed, it is desirable to minimize the amount of mesh on each surface in order to maximize the amount of black body material directly exposed to solar radiation. The mesh may be formed of any material capable of withstanding the very high temperatures at the focus 24 without losing its ability to retain the elements 47. As a practical matter, metals which can be readily and economically formed into mesh, such as stainless steel, e.g., SS 310, are most desirable. It will be apparent that the convex shape assumed by the mesh surfaces 44, 45 determines the convex shape assumed by the close-to-ideal black body element bed. This shape desirably, although not necessarily, conforms to the shape of the reflector 22 and preferably is a shape which allows as much of the bed as possible to be equidistant from the focus 24 in order that the reflected solar radiation is uniformly distributed over the entire collector surface. To accomplish these purposes convex shapes such as paraboloids, hemispheres, hemispheroids, hemiellipsoids and hyperboloids, among others, are preferred. As a practical matter, in view of the preferred two inch minimum bed thicknesses, the maximum cross-sectional dimension "T", of these convex shapes is at least about 1 foot, minimum dimensions suitable for an approximately 10 kw unit. However, as will be appreciated, larger units containing larger beds and increased air flow capabilities are capable of significantly greater energy production.

Figure 2:
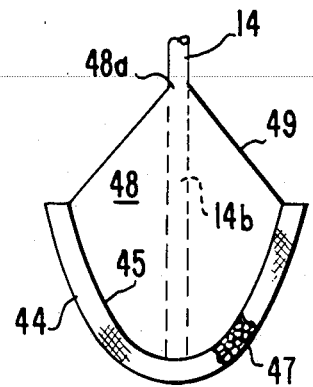
FIG. 2 is a partial elevational view of one form of solar radiation receiver means useful in the practice of the present invention.
Figure 3:
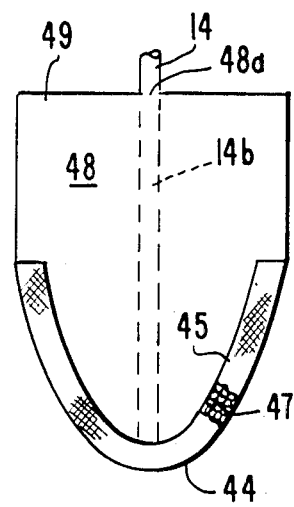
FIG. 3 is a partial elevational view of another form of solar radiation receiver means useful in the practice of the present invention.

Exemplary configurations meeting the foregoing criteria are illustrated in FIGS. 1, 2 and 3 which show collectors 18 having very large surface areas by virtue of the plurality of randomly arranged solar radiation absorbing elements 47 housed between mesh surfaces 44, 45 for defining a uniform thickness bed through which air is drawn and heated. The heated air flows into the interior 48 of the collectors, defined between the inner mesh surface 45 and removable insulating cover 49. Cover 49 may be flat, as in FIG. 1 wherein the heated air is removed from the collector interior 48 through an opening 48a in the convex bed surface. Cover 49 is desirably conical or cylindrical where, as in FIGS. 2 and 3, the heated air is removed through an opening 48a in cover 49 from the top of the collector interior.

Heat transfer from receiver 18 to the ambient air is enhanced by causing air flow through the bed to follow the tortuous path between the randomly arranged elements 47 and, by assuring the uniformity of the bed thickness "t" along the entire bed length in order to prevent the air flow from finding a path of least resistance. The air is heated in the bed in accordance with the surface temperature of the elements 47 and the air flow volume. It is noteworthy that it is only by virtue of utilizing randomly arranged solar radiation absorption and heat transfer elements defining a tortuous air passage-type of configuration and exposing a large surface area of the elements to solar radiation impingement and ambient air flow, that heat transfer by way of radiation can be efficiently accomplished. Heat transfer by way of conduction cannot be efficiently achieved using black body type materials and, therefore, configurations which include closed conduits for confined heat transfer fluid flow are not desirable.

Figure 5:
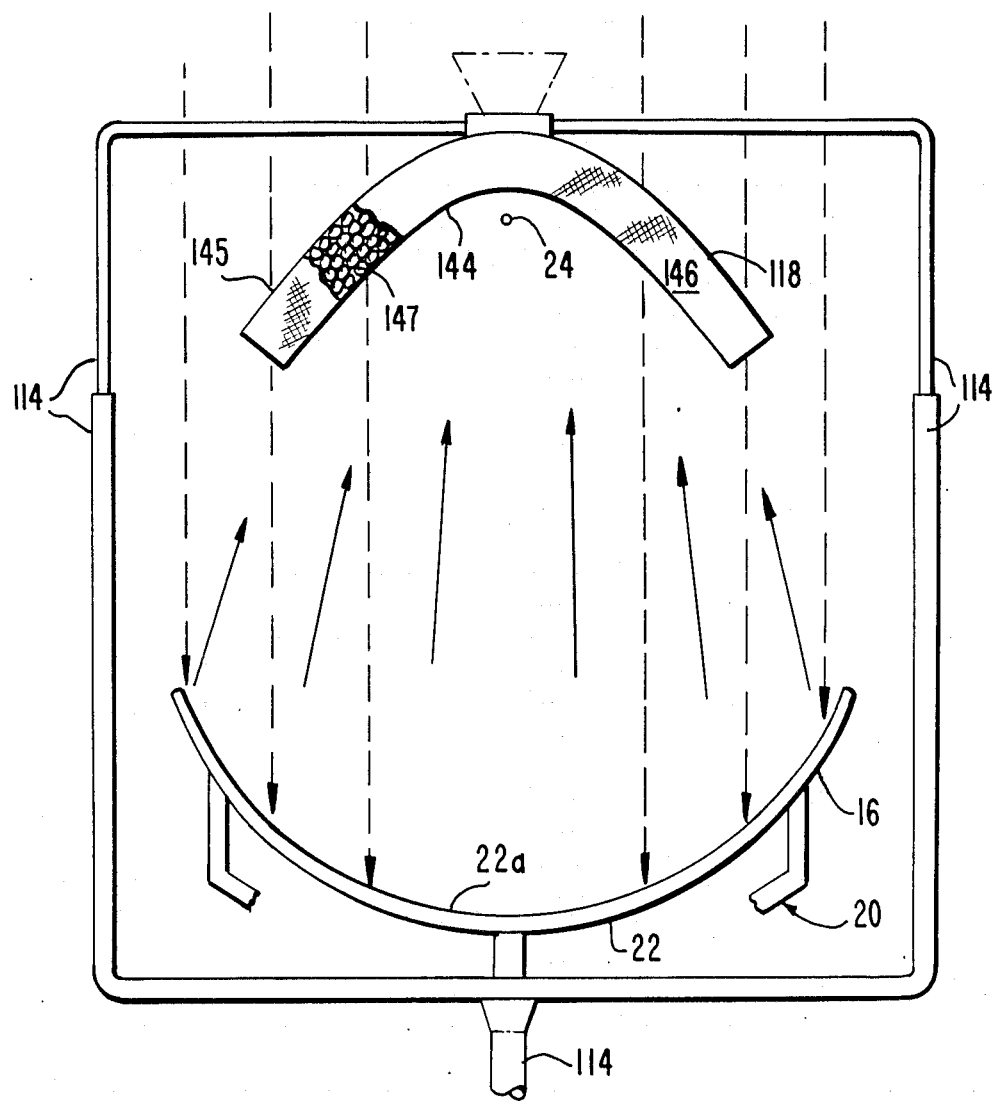
FIG. 5 is a partial elevational view of another system for collecting solar radiation in accordance with the present invention.

In some instances, where larger collectors are desired the receiver means advantageously takes the form of a porous concave solar collector in which the hollow of the concavity faces toward the parabolic reflector. In this form of collector, as can be seen in FIG. 5, the structure of concave receiver means 118 is substantially the same as the structure of convex receiver means 18 except that outer surface 145 is solid rather than porous, allowing ambient air to be drawn through porous, concave inner surface 144 and heated as it passes over and through elements 147 of the concave annular bed. Heated ambient air is ducted from annular space 146 of receiver means 118 through ambient air conduit 114, which may also serve as telescoping support braces for supporting receiver means 118. Concave receiver means have the advantages that annular space 146 is more easily filled with black body elements 147, as via a funnel (shown in phantom) for feeding such elements into the top of the receiver means; the heated ambient air conduit means 114 readily serves the dual purpose of conduit means and structural support elements; the concave configuration is better protected from environmental damage and/or interference than is the convex configuration, a feature which may be of significance when the receiver means is used in remote areas, such as in deserts, and the like.

Heated ambient air is ducted from receiver means 18, 118 through ambient air conduit means 14 (which may include an apertured portion 14b within interior 48), 114 into energy reclamation unit 200. Unit 200 is operable: (1) to cool the heated ambient air prior to ducting it to a thermal energy reclamation heat exchanger; (2) to heat compressed air to within a few degrees of the temperature of the ambient air which entered unit 200; and (3) to extract mechanical energy from the heated compressed air prior to ducting the compressed air to a thermal energy reclamation heat exchanger.

Unit 200 includes two similar packed towers or columns 50, 52. Each of the towers 50, 52 is similar in construction and content to the regenerator described by Russell B. Scott at pages 29–31 of Cryogenic Engineering, published in 1959 by D. Van Nostrand Co., Princeton, N.J. Each of the towers contains loose solids, for example, ceramic balls, quartzite pebbles, steel shot, etc., pancakes wound from thin corrugated aluminum ribbon, or other solids having relatively large surface area to volume ratios, relatively high heat capacitances and the capability of storing heat and resisting corrosion. Typically, the packing for the regenerator towers has a surface area to volume ratio and packing capability sufficient that the regenerator has a surface of 1000 to 2000 square ft. per cubic foot.

Automatic switch valves 54a, 54b are provided at the end of towers 50, 52 adjacent feed conduit 14a. Feed conduit 14a connects with the valves 54a. Tower connection conduits 56 communicate the towers 50, 52 with the valves 54a, 54b. Tower connection conduits 58 communicate the towers 50, 52 with automatic switch valves 60a, 60b. Air feed line 68 and compressor 70 provide a compressed air flow through valves 60b into towers 50, 52 while heated air dischrge conduit 66 connects with valves 54b for providing a reclamation flow path out of towers 50, 52 through expansion turbine 72 and return line 74 to a point upstream of compressor 62 and reclamation heat exchanger 76. Compressor 62 is included in warm air discharge line 64 to provide the suction for drawing ambient air through receiver means 18 into conduit 14.

The manner by which heated ambient air is treated in unit 200 may be visualized as that of subjecting the ambient air in successive like cycles to cooling in towers 50, 52. During each cycle, a different step is being conducted in each of towers 50, 52. While a first tower is serving as the cooling tower to cool the heated ambient air, the other tower is serving to heat the compressed air fed therethrough via air feed line 68. In the next cycle, the roles of the respective towers are reversed.

Thus in a first cycle one of the towers 50, 52 is selected as the cooling tower into which the heated ambient air is ducted and the corresponding valve 54a is opened. If tower 50 is to serve as the cooling tower, valve 54a associated therewith and valve 54b associated with tower 52 are opened while valve 54b associated with tower 50 and valve 54a associated with tower 52 remain closed. The heated ambient air flows from feed conduit 14a through valve 54a upwardly into the bottom of tower 50 in which the ambient air is cooled. The cooled, but still warm ambient air, exits from the top of tower 50 via valve 60a and warm air discharge line 64, is compressed in compressor 62, which desirably adds heat values to the warm air, and passes to vent via reclamation heat exchanger 76. Thus, compressor 62 may be operated without the conventional after cooler in order that the heat energy added to the warm ambient air by the compressor is retained in the system and ultimately reclaimed. The heat values from the warm ambient air in line 64 may be discarded but, more likely, will be recovered or used in some manner, possibly for absorption cooling. For example, the heat values may be transferred to a power fluid in reclamation heat exchanger 76, as will be more fully described hereinafter, and reclaimed therefrom or this stream of warm ambient air can be used for an absorption cooling system. At the same time the tower 50 is heated by the ambient air passing therethrough in preparation for serving as the compressed air heating tower in the next cycle.

The heat energy stored in tower 52 is recovered by passing compressed air through air feed line 68 into and downwardly through tower 52 in which the air is heated while the tower is cooled (it is assumed that tower 52 had been pre-heated in a previous cycle by passage of heated ambient air therethrough). The heated compressed air leaves the bottom of tower 52 by way of tower connection conduit 56 through valve 54b and heated air discharge conduit 66. The energy content may be reclaimed from the heated compressed air stream by passing the stream through expansion turbine 72 to cool the compressed air by substantially isentropic expansion while at the same time producing shaft work. To convert the shaft work to a more useful form of energy, a power generator 78 is coupled to the drive shaft of the turbine 72. A filter means 71, such as a cyclone or screen, may be inserted in heated air discharge conduit 66 upstream of turbine 72 to remove any solid particulate matter which may be picked up by the compressed air stream from the tower packing. The cooled, but still warm air exhausting turbine 72 is ducted via return line 74 to warm air discharge line 64 upstream of compressor 62, at which point it is admixed with the warm ambient air exiting tower 50. The resulting combined warm air stream is compressed in compressor 62, transfers a portion of its heat values to a power fluid in reclamation heat exchanger 76 and passes to vent.

In a typical system the heated ambient air entering cooling tower 50 is at a temperature of about 450° to 550° C. and is cooled in the tower to about 225° to 240° C. In a unit intended to be readily transportable, assembled on-site and used in remote areas it is particularly desirable to depart from conventional arrangements and to orient the regenerators with the hot (heated ambient air entering) end at the bottom as shown. Such an arrangement allows any sand or dirt entering the regenerator to be blown back for purposes of cleaning and removal of undesirable contaminants. It also permits easier accessibility to the "hot" lines which must be insulated. It is, of course, important to maintain the temperature at the relatively cool end of the towers 50, 52 at a constant level in order that the temperature of the compressed air from line 68 passed through the tower to recover the heat energy stored therein from the previous cycle may be maintained at a temperature below that of the temperature at the relatively cool end of the tower. This can readily be achieved by positioning temperatue sensors 80, 82 at the relatively cool end of each tower 50, 52 and regulating the compression ratio in compressor 70 such that the compressed air temperature sensed at sensor 84 in air feed line 68 is below that of the temperatures sensed by sensors 80, 82. The compressed air entering tower 52 via air feed line 68 is heated in tower 52 to within 5° to 10° C. of the temperature of the heated ambient air entering tower 50. Following expansion through expansion turbine 72 the turbine exhaust air is within the same general temperature range as the warm ambient air at the relatively cool end of towers 50, 52, i.e., about 225° to 240° C., at which temperature it is admixed with the warm ambient air exiting tower 50 and passed through compressor 62 and reclamation heat exchanger 76. The compressor increases the temperature of the air passing therethrough by about 25° to 40° C. while the reclamation heat exchanger reduces the temperature of the air exiting therefrom to about 80° C. or below, at which temperature very little recoverable thermal energy is wasted by venting the air stream.

The next cycle is like the one just described except that tower 52 now serves as the heated ambient air cooling tower and tower 50 as the compressed air heating tower. It will be appreciated that following the previous cycle, tower 50 was left in a relatively heated state by the passage of heated ambient air therethrough whereas tower 52 was left in a relatively cooled state by virtue of having given up its heat content to the compressed air passing therethrough. In this next cycle the heated ambient air flows from feed conduit 14a through valve 54a into tower 52 in which the heated ambient air is cooled while the tower is heated. The cooled, but still warm ambient air, exiting tower 52 is then ducted via warm air discharge line 64 to compressor 62 in which it is compressed prior to relinquishing the major portion of its thermal values in reclamation heat exchanger 76. The compressed air entering tower 50 via air feed line 68 is heated while the tower is cooled and the resulting heated air leaving tower 50 via heated air discharge conduit 66 is expanded and cooled through expansion turbine 72 and then admixed with the warm ambient air in line 64 upstream of compressor 62 prior to thermal reclamation in reclamation heat exchanger 76.

One means for reclaiming the heat energy contained in the warm ambient air exiting compressor 62 comprises passing the air through reclamation heat exchanger 76 wherein it gives up its heat energy to a power fluid which, in turn, operates as the fluid in a Rankine cycle engine to do useful work. Heat exchanger 76 may be of any conventional type useful to transfer heat energy to a power fluid and may be either a single or multiple stage unit. As the air passes through the heat exchanger 76 it sacrifices sensible heat to the power fluid which circulates in coils 86. The power fluid which is heated by the warm ambient air passing through heat exchanger 76 is used to perform useful work. In the preferred embodiment, the heat exchanger coils 86 form the boiler of an external combustion engine. Such an engine typically includes an expansion turbine 88, a condenser 90, and a pump 92, connected in series by conduits 94, 96, 98, 100. Power fluid heated during passage through the coils 86 is expanded in the turbine 88 and serves to drive a generator. The power fluid is then ducted through the condenser 90 and the pump 92 for return to the heat exchanger coils 86. It should be appreciated that the Rankine cycle components reduce the portability of the system and may advantageously be deleted on mobile units where transportability and like characteristics are of paramount importance. In such units the warm air is discharged through line 64.

The invention will be better understood by reference to the following example which is illustrative of the operation of the method and system of the present invention.

EXAMPLE

A parabolic dish solar reflector having a diameter of 10 meters is capable of reflecting solar radiation under optimum conditions at the rate of 1400 watts/$m^2$-hr, providing a capacity of 110 kw/hr (Kwh). A parabolic solar collector having an outer diameter of about 0.67 meters and inner and outer mesh surfaces defining a 3 inch wide annular space therebetween containing $\frac{1}{4}$-$\frac{1}{2}$ inch diameter irregularly surfaced, generally spherical ceramic balls formed of burnt clay and graphite, similar to the collector of FIG. 2, is positioned at the parabolic focal point. By utilizing the suction side of compressor 62 to draw a flow of ambient air through the 3 inch thick bed of ceramic balls and over the large surface area defined thereby to exchange heat between the high temperature ceramic balls and the ambient air, a heated ambient air flow of 700 $Nm^3$/hr (normal cubic meter per hour) at 500° C. is established through ambient air conduit 14 and feed conduit 14a. The heated ambient air flows through regenerator tower 50 to deposit heat on the solid materials therein. Warm ambient air exits tower 50 at about 230° C.

While regenerator tower 50 is heating up, regenerator tower 52 (pre-heated in a previous cycle) is charged with 700 $Nm^3$/hr of air which has been compressed from 1 BAR and 40° C. to about 5 BAR and 222° C. is compressor 70. The work of compression requires about 56 Kwh. The compressed air flows through regenerator tower 52 to withdraw heat from the solid materials therein. Hot compressed air at about 490° C. exits tower 52 and is ducted to and through expansion turbine 72 wherein the hot compressed air is expanded to about 1.0 BAR and a temperature of about 225° C. The expansion turbine drives a generator to yield about 87 Kwh. The cooled turbine exhaust at about 225° C. is admixed with the warm ambient air exiting tower 50 and the combined 1400 $Nm^3$/hr air flow at about 225°-230° C. is compressed in compressor 62 to a pressure of about 1.1 BAR and a temperature of about 254° C. the compression work requies about 14 Kwh. After passing through reclamation heat exchanger and transferring a major portion of its thermal energy to a power fluid, the combined air flow exits the heat exchanger at about 80° C. and is vented.

The heat lost by the combined air stream in cooling from 254° C. to 80° C. in the reclamation heat exchanger causes a corresponding heat gain by the power fluid circulating through the coil thereof as the fluid in a Rankine cycle engine. The power fluid is pumped through the closed cycle at an expense of 2 Kwh but expands in passing through expansion turbine 88 to drive a generator to yield about 28 Kwh.

Recognizing that the solar energy input to the system is free and therefore need not be considered in an economic energy balance, the energy balance for the system is as follows:

| INPUT | | OUTPUT | |
|---|---|---|---|
| Compressor (70) | 56 Kwh | Expansion turbine (72) | 87 Kwh |
| Compressor (62) | 14 Kwh | Expansion turbine (88) | 28 Kwh |
| Pump (92) | 2 Kwh | | |
| TOTAL | 72 Kwh | TOTAL | 115 Kwh |

Even considering the solar energy input of 110 Kwh, the overall system efficiency is 115 Kwh output vs. 182 Kwh input, an overall recovery efficiency greater than 60%. Viewed in another manner, the net energy recovery is 115−72=43 Kwh, yielding a net efficiency of about 40%, which is still excellent.

INDUSTRIAL APPLICABILITY

The method and apparatus of the present invention for the collection of solar radiation and the recovery of thermal energy therefrom is efficiently and broadly applicable to the production of energy for all conceivable uses, industrial, agricultural, utility, and the like. The system is useful anywhere where there is access to sunlight and air. In particular, the present system is formed of rugged, compact, air transportable, skid mountable, air droppable components susceptible to ready on-site assembly. Therefore, it is ideal for use in remote areas for providing power to operate irrigation and/or drinking water pumps or to generate electricity. It is also ideal for providing emergency power in devastated areas struck by natural disasters such as flood, earthquake and the like. The system of the present invention is particularly unique in providing an energy storage capability heretofore only available using large, unwieldy and untransportable pebble beds or by converting thermal energy to mechanical energy for pumping water into a water tower or elevated reservoir and storing the energy in the form of potential energy of water. According to the present invention, the close to ideal black body radiation absorbing elements function in a manner similar to pebble bed storage sites in retaining thermal energy for a prolonged period until there is a need for the energy, at which time ambient air may be drawn through and over the elements, as hereinbefore described, to transfer the thermal energy to the ambient air for utilization. Another "built-in" form of thermal storage inherent in the present system are the regenerator towers which will maintain their temperatures for about 48 hours, allowing minimum start-up time whenever energy production is required and possible. Both the solar collector bed elements and the regenerator towers allow energy generated during sunlight hours to be stored as thermal energy for long periods of time and used whenever solar collection and conversion is not feasible, such as during nighttime hours.

What is claimed is:

1. An apparatus for the collection of solar radiation and the recovery of thermal energy therefrom comprising solar radiation collection means and energy reclamation means, said solar radiation collection means including solar radiation receiver means comprising a close to ideal black body solar collector and solar radiation concentrating means, said concentrating means comprising reflector means for focusing incident solar radiation onto a heat sink region in which said black body collector is positioned for absorbing the incident solar radiation and converting said radiation to thermal energy substantially completely by radiation whereby the temperature of said collector is increased, said solar collector comprising a high temperature resistant, porous enclosure having inner and outer surfaces arranged in spaced apart nested relationship for defining therebetween an annular space, a plurality of close to ideal black body, a high surface area solar radiation absorbing elements randomly filling said annular space, at least said inner surface being porous for allowing ambient air to flow therethrough into heat transfer relationship with said elements, the openings in said porous surface being smaller than the minimum dimension of said elements for retaining said elements within said annular space, said elements defining an annular bed having a tortuous path for air flow therethrough onto which solar radiation impinges for increasing the temperature of said bed and from which thermal energy is transferred to ambient air flowing from outside said bed via tortuous path through said bed for heating said ambient air;

said energy reclamation means including means for causing a flow of ambient air through said bed into direct heat transfer relationship with the said increased temperature surfaces of said collctor for heating the ambient air, the energy transfer to said ambient air occurring substantially completely by radiation and convection, means for reclaiming thermal energy from said heated ambient air, whereby said heated air is cooled, and means for directing a flow of heated ambient air from said collector to said reclamation means.

2. An apparatus, as claimed in claim 1, wherein said porous enclosure is convex, said inner and outer surfaces are porous and convex and said elements define a convex annular bed through which said ambient air flows into the interior of said collector, said solar collector being oriented with said convex surfaces curving outwardly toward said reflector means.

3. An apparatus, as claimed in claim 2, wherein said inner and outer surfaces comprise high temperature resistant mesh and said elements comprise spheres.

4. An apparatus as claimed in claim 1, wherein said porous inner surface is concave, said solar collector being oriented with the hollow of said concave surface facing toward said reflector means.

5. An apparatus, as claimed in claims 2 or 4, wherein said receiver means is mounted to said concentrating means for unitary movement of both as said concentrating means is moved for tracking the position of the sun.

6. An apparatus, as claimed in claim 5, including means for moving said receiver means relative to said concentrating means.

7. An apparatus, as claimed in claims 2 or 4, wherein said concentrating means comprises parabolic reflector means for reflecting incident solar radiation and concentrating said radiation at the focal point of said reflector means.

8. An apparatus, as claimed in claim 7, including means for moving said receiver means relative to said focal point.

9. An aparatus, as claimed in claims 2 or 4, wherein said means for reclaiming the energy of said heated ambient air comprises;
first heat exchange means for passing said heated ambient air into direct heat exchange relationship with a relatively high heat capacitance solid material to exchange heat between said heated ambient air and said solid material and concurrently cool said ambient air and heat said solid material;
conduit means in air flow communication with said collector and said means for causing ambient air flow for directing said heated ambient air from said collector to said first heat exchange means;
second heat exchange means for passing compressed air into direct heat exchange relationship with a relatively high heat capacitance solid material to exchange heat between said compressed air and said slid material, whereby compressed air is passed through said second heat exchange means to concurrently cool said solid material and heat said compressed air; and
expansion turbine means for expanding said heated compressed air to produce shaft work whereby cooled air exits said turbine means.

10. An apparatus, as claimed in claim 9, wherein said first and second heat exchange means are arranged in parallel relationship and including means for directing said heated ambient air and said compressed air, alternately, to said first and second heat exchange means whereby said heated ambient air is directed to said heat exchange means containing relatively cool solid material and said compressed air is directed to said heat exchange means containing relatively hot solid material.

11. An apparatus, as claimed in claim 10, wherein each of said heat exchange means comprises a regenerator tower containing said relatively high heat capacitance solid material.

12. An apparatus, as claimed in claim 11, wherein said regenerator towers are oriented with said heated ambient air receiving portion thereof arranged below said compressed air receiving portion.

13. An apparatus, as claimed in claim 10, further including warm air heat reclamation means in air flow communication with said first and second heat exchange means and said expansion turbine means for receiving the cooled ambient air exiting each of said heat exchange means and the cooled compressed air exiting said gas turbine means for recovering at least a portion of the thermal energy content of said cooled air streams.

14. An apparatus, as claimed in claim 13, wherein said warm air heat reclamation means comprises means for passing said cooled air streams into heat exchange relationship with a power fluid whereby at least a portion of the thermal energy in said cooled air streams is transferred to said power fluid for concurrently heating said power fluid and further cooling said cooled air streams.

15. An apparatus, as claimed in claims 2 or 4, wherein said means for causing ambient air flow comprises compressor means in air flow communication with said collector.

16. An apparatus, as claimed in claim 15, wherein said compressor means includes a compressor operable to compress said cooled air stream at a point downstream of said collector.

17. A method for the collection of solar radiation and the recovery of thermal energy therefrom, comprising the steps of:
(a) focusing solar radiation on and transferring, substantially completely by radiation, solar energy to solar radiation receiver means for increasing the temperature of said receiver means, said focusing being accomplished by providing reflector means for focusing incident solar radiation onto a heat sink region in which said receiver means is positioned, said solar energy transfer to said receiver means comprising providing a high temperture resistant, porous enclosure having inner and outer surfaces arranged in spaced apart nested relationship for defining therebetween an annular space, a plurality of close to ideal black body, high surface area solar radiation absorbing elements randomly filling said annular space, at least said inner surface being porous for allowing ambient air to flow therethrough into heat transfer relationship with said elements, the openings in said porous surface being smaller and the minimum dimension of said elements for retaining said elements within said annular space, said elements defining an annular bed having a tortuous path for air flow therethrough onto which solar radiation impinges for increasing the temperature of said bed and from which thermal energy is transferred to ambient air flowing via said tortuous path through said bed for heating said ambient air;
(b) causing a flow of ambient air into heat exchange relationship with said increased temperature surfaces of said collector and transferring, substantially completely by radiation and convection, thermal energy to said ambient air for producing heated ambient air; and
(c) reclaiming thermal energy from said heated ambient air.

18. A method, as claimed in claim 17 wherein the step of reclaiming thermal energy includes
passing said heated ambient air through a heat exchange zone in direct heat exchange relationship with a relatively high heat capacitance solid material to concurrently cool said ambient air and heat said solid material;
recovering at least a portion of the thermal energy of the heated ambient air by passing compressed air in direct heat exchange relationship with said heated solid material to concurrently cool said solid material and heat said compressed air; and
expanding said heated compressed air through an expansion turbine means for producing shaft work and a cooled air stream.

19. A method, as claimed in claim 18, wherein said heat exchange zone comprises first and second heat exchange sub-zones arranged in parallel relationship and said heated ambient air is passed, alternately, through said first and second sub-zones, said thermal energy from said first sub-zone being recovered by said compressed air while said heated ambient air is passed through said second sub-zone.

20. A method, as claimed in claim 19, wherein said cooled ambient air stream exiting said heat exchange zone and said cooled compressed air stream exiting said gas turbine means are passed in heat transfer relationship with a power fluid whereby at least a portion of the thermal energy remaining in said cooled air streams is transferred to said power fluid for concurrently heating the power fluid and further cooling said cooled air streams.

21. An apparatus, as claimed in claims 1, 2 or 4, wherein said close to ideal black body elements have an emissivity of at least 0.80 at the heat sink region temperatures.

* * * * *